United States Patent [19]

Lakshmanan

[11] 3,932,330

[45] Jan. 13, 1976

[54] ADHESIVE COMPOSITION

[75] Inventor: Pallavoor R. Lakshmanan, Allison Park, Pa.

[73] Assignee: Gulf Research & Development Company, Pittsburgh, Pa.

[22] Filed: Aug. 1, 1974

[21] Appl. No.: 493,774

[52] U.S. Cl. ......... 260/27 BB; 156/334; 260/28.5 B; 428/355; 428/497; 428/516; 428/484
[51] Int. Cl.² ................. C08L 91/00; C08L 93/00; C09J 3/12; C09J 3/14
[58] Field of Search ............ 260/27 R, 28.5, 28.5 B, 260/27 BB; 117/122, 122 R; 156/334; 428/355

[56] References Cited
UNITED STATES PATENTS

| | | | |
|---|---|---|---|
| 3,290,275 | 12/1966 | Brandt | 260/82 |
| 3,441,530 | 4/1969 | Bauer | 260/28.5 |
| 3,535,152 | 10/1970 | Korpman | 117/122 |

OTHER PUBLICATIONS

Rubber World–Materials & Compounding Ingredients for Rubber & Plastics (Publishers Printing Co.) (Louisville, Ky.) (1965), page 388.

*Primary Examiner*—Donald E. Czaja
*Assistant Examiner*—H. H. Fletcher

[57] ABSTRACT

An adhesive composition consisting essentially of a styrene-isoprene block copolymer, an isoprene-piperylene copolymer, a zinc salt of rosin and a microcrystalline wax.

6 Claims, No Drawings

ADHESIVE COMPOSITION

This invention relates to an adhesive composition having a bond strength at room temperature (about 72° F.) and above of at least about one pound per inch, preferably at least about 1.5 pounds per inch, consisting essentially of a styrene-isoprene block copolymer, an isoprene-piperylene copolymer, a zinc salt of rosin (zinc resinate) and a microcrystalline wax.

The styrene-isoprene block copolymer product present in the adhesive composition of the present invention has the following general configuration:

A — B — A, wherein each terminal A is a styrene polymer block with a glass transition temperature above about room temperature (26° C.) and which is relatively incompatible with the elastomeric segment B, defined hereinafter, with the average molecular weight of each A, being from about 2,000 to about 100,000, preferably from about 5,000 to about 50,000. B is an isoprene polymer with a glass transition temperature below about room temperature (26° C.), with the average molecular weight of B being from about 25,000 to about 1,000,000, preferably from about 50,000 to about 500,000. The difference in glass transition temperature between an end block A, and a center block B, is preferably greater than about 100° C. In the block copolymer used herein the total of the terminal blocks A will amount to about eight to about 50 weight percent, preferably about 10 to about 40 weight percent, based on the total weight of the block copolymer.

The second component of the adhesive herein is an isoprenepiperylene copolymer. These copolymers can be obtained, for example, by polymerization of a $C_5$ stream of aliphatic petroleum derivatives containing a major proportion of piperylene and isoprene monomers, for example, as in U.S. Pat. No. 3,290,275. Although the stream being polymerized can contain small amounts of higher carbon number monomers, the character of the stream is essentially that attributable to its $C_5$ components. The stream can contain, for example, about 25 weight percent each of piperylene and isoprene, with the remainder including, for example, tertiary amylenes, tertiary monomers, such as styrene or beta pinene, etc. but the copolymer will be made up mainly of piperylene and isoprene. In general, the melting points of these copolymers are in the range of about 70° to about 130° C.

The third component of the adhesive herein is a zinc salt of rosin (including a disproportionated rosin) having a zinc content of between about four and about nine weight percent and a melting point (Ring and Ball softening points) of between about 80° to about 190° C. Rosin disproportionation involves, for example, heating the resin in excess of 200° C. to convert the oxidation-susceptible sites, e.g., conjugated double bond in the abietic acid structure, to less susceptible structures, such as dehydro-abietic acid, tetrahydro-abietic acid and dihydro-abietic acid.

The fourth component of the claimed adhesive is a microcrystalline wax. By "microcrystalline wax" I intend to include branched-chain hydrocarbons and alkylcycloaliphatic (naphthenic hydrocarbons) as well as straight-chain hydrocarbons whose molecular weight range is from about 400 to about 800, as defined, for example, in Encyclopedia of Polymer Science and Technology, Interscience Publishers-A division of John Wiley, New York, New York, 1971, Volume 14, pages 770 and 771.

The adhesive composition herein will consist essentially of the following components:

| Component | Weight Per Cent Broad Range | Preferred Range |
|---|---|---|
| Styrene-Isoprene Block Copolymer | 15–30 | 20–28 |
| Mixture of Isoprene-Piperylene Copolymer and Zinc Salt of Rosin | 15–60 | 20–60 |
| Microcrystalline Wax | 70–10 | 60–12 |

While the combined amounts of the zinc salt of rosin and the isoprene-piperylene copolymer must be present within the ranges identified above in order to obtain the desired bond strength, it is equally critical that the weight ratios of the zinc salt of rosin and the isoprene-piperylene copolymer be within the range of about 0.55:1 to about 50:1, preferably within the range of about 1:1 to about 5:1.

If desired, an antioxidant, such as 1,3,5-trimethyl-2,4,6-(3,5-ditertiarybutyl-4-hydroxybenzyl)benzene or dilaurylthiopropionate, can also be incorporated in the adhesive composition in an amount of about 0.1 to about five, preferably about 0.2 to about two, weight percent, based on the weight of the final composition.

The adhesive composition can be prepared in any conventional manner. Thus, for example, a preferred procedure involves the use of the so-called melt-mixing technique wherein the microcrystalline wax, together with antioxidant, if used, is maintained in a stirred, molten state at a temperature of about 100° to about 190° C., preferably about 130° to about 170° C., during which time the isoprene-piperylene copolymer and the zinc salt of rosin are added thereto, followed by the styrene-isoprene block copolymer. Mixing is continued until a homogeneous mixture is obtained.

The new adhesives of the present invention can be used as a hot melt adhesive to bond a plastic film, such as polyethylene, to itself or to paper, cardboard, aluminum foil, etc. In particular, the new adhesives can be used to bond polyethylene to itself. A particularly preferred utility resides in bonding polyethylene to itself in the preparation of polyethylene grocery bags that are often used in place of Kraft paper grocery bags. In making such bags that would be competitive with those made of Kraft paper it is desirable that polyethylene bags have a bond strength at room temperature (about 72° F.) and above of at least about one pound per inch, preferably at least about 1.5 pounds per inch.

The improved adhesive compositions of the present invention can be understood by reference to the following. Compositions were prepared following the melt-mixing technique described, using a temperature of 160° to 170° C. containing (1) Kraton 1107; (2) Statac 100 alone or with Zirex; (3) Multiwax 180M, Microwax 15, Starwax 100 or Besquare 195; and the antioxidants 1,3,5-tri-methyl-2,4,6-(3,5-ditertiary-4-hydroxybenzyl)benzene and dilauryl-thiodipropionate.

Polyethylene laminate test specimens were prepared by applying each of the adhesives so prepared to a 2.0 mil (3 inches X 10 inches) high density polyethylene film by means of an electrically-operated glue gun that dispensed molten adhesive either by mechanical or manual means. The adhesive was applied at 149° to 154° C. to the film as a continuous bead ⅛ inch wide and then a film of similar dimension was placed on top of the film carrying the bead of adhesive. The laminates were permitted to rest for 48 hours prior to test specimen preparations. Three specimens, each 1 inch × 3 inches, were then cut from the film samples in a direction across the adhesive direction. The bond strength was measured by peeling at the glue line by means of a suitable test device, such as an Instron test device, at a peel rate of 2 inches per minute. The maximum strength in pounds necessary to cause rupture of the bond was noted. The average of three such determinations was recorded. The results obtained are tabulated below in Table I.

Saybolt Viscosity (ASTM D-88) at 210° F. SUS of 85 and is made and sold by Petrolite Corporation.

The data in Table I illustrates the uniqueness of the adhesive composition defined and claimed herein in providing a bond strength that is adequate at room temperature and above. With none of the compositions of Examples 1, 2 and 3, wherein only an isoprenepiperylene copolymer is present but no zinc salt of rosin, was a good bond strength obtained. Examples 4 and 5 show that even if a zinc salt of rosin is also present, but in amounts below the defined level, a good bond strength is not achieved. However, the remaining examples adequately show that when the two are present within the claimed ranges, adhesive compositions are Table I

| Run Number | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Components, Grams | | | | | | | | | | | | | | | |
| Kraton 1107 | 24 | 20 | 20 | 24 | 24 | 24 | 24 | 24 | 24 | 24 | 24 | 24 | 24 | 24 | 24 |
| Zirex | None | None | None | 6 | 10 | 15 | 20 | 24 | 24 | 24 | 24 | 24 | 24 | 24 | 24 |
| Sta-tac 100 | 30 | 20 | 30 | 24 | 20 | 15 | 10 | 6 | 20 | 6 | 20 | 6 | 20 | 6 | 20 |
| Multiwax 180M | 46 | None | None | 46 | 46 | 46 | 46 | 46 | 32 | None | None | None | None | None | None |
| Microwax 15 | None | 60 | 60 | None | None | None | None | None | None | 46 | 32 | None | None | None | None |
| Starwax 100 | None | None | None | None | None | None | None | None | None | None | None | 46 | 32 | None | None |
| Besquare 195 | None | None | None | None | None | None | None | None | None | None | None | None | None | 46 | 32 |
| 1,3,5-trimethyl-2,4,6-(3,5-ditertiary-4-hydroxybenzyl) benzene | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Dilaurylthiodipropionate | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Results | | | | | | | | | | | | | | | |
| Viscosity, Cps at 300° F. | 10,500 | 1875 | 2000 | 9125 | 9650 | 9450 | 7132 | 6875 | 7125 | 3200 | 3900 | 6375 | 5350 | 5350 | 6225 |
| 350° F. | 1498 | Not taken | Not taken | 1512 | 1700 | 2062 | 1850 | 2010 | 2387 | 1225 | 1800 | 1175 | 1737 | 1137 | 2000 |
| Ring and Ball Softening Point, °F. | 200 | 194 | 198 | 199 | 194 | 203 | 200 | 200 | 200 | 200 | 202 | 208 | 208 | 208 | 208 |
| Bond Strength, Pounds/Inch At | | | | | | | | | | | | | | | |
| 120° F. | 0.6 | 0.7 | 0.9 | 0.7 | 0.9 | 1.4 | 1.1 | 1.2 | 1.4 | 1.6 | 2.0 | 1.3 | 1.5 | 1.9 | 3.7 |
| 73° F. | 6.7* | 6.4* | 6.2* | 6.6 | 6.2 | 6.6 | 7.5 | 5.4* | 7.2* | 4.7* | 6.5* | 6.1* | 6.4* | 6.0* | 6.2* |

*Film tore at indicated bond strength

Referring to the components used in the adhesive compositions above, Kraton 1107 is a styrene-isoprene block copolymer made and sold by Shell Chemicals wherein the terminal styrene block has a molecular weight of about 2,000 to about 100,000 and the center isoprene block has a molecular weight of about 25,000 to about 1,000,000, with the styrene block constituting about 15 percent by weight of the total block; Zirex is a zinc resinate containing 8.7 weight percent zinc having a melting point of 158° to 164° C. and is made by Rheichold Chemicals, Inc.; Sta-tac 100 is an isoprene-piperylene copolymer made and sold by Rheichold Chemicals, Inc. having a melting point of 105° C.; Multiwax 180M is a microcrystalline wax having a melting point (ASTM D-127) of 180° to 190° F., a needle penetration (ASTM D-1321) at 77° F. of 15 to 20 and a Saybolt Viscosity (ASTM D-88) at 210° F. SUS of 75 to 90 and is made and sold by Sonneborn Division of Witco Chemicals Company; Microwax 15 is a microcrystalline wax having a melting point (ASTM D-127) of 187° F. and is made and sold by International Wax Refining Company; Starwax 100 is a microcrystalline wax having a melting point (ASTM D-127) of 182° to 187° F., a needle penetration (ASTM D-1321) at 77° F. of 14 to 16 and is made and sold by Petrolite Corporation; and Besquare 195 is a microcrystalline wax having a melting point (ASTM D-127) of 193 to 198, a needle penetration (ASTM D-1321) at 77° F. of 6 to 7, a obtained which will provide good bond strengths. Surprisingly, the presence of both the isoprene-isoprene copolymer and the zinc salt of rosin does not adversely increase the viscosity of the desired composition.

Obviously, many modifications and variations of the invention, as hereinabove set forth, can be made without departing from the spirit and scope thereof and, therefore, only such limitations should be imposed as are indicated in the appended claims.

I claim:

1. An adhesive composition consisting essentially of a styrene-isoprene block copolymer, an isoprene-piperylene copolymer, a zinc salt of rosin having a zinc content of between about four and about nine percent and a melting point of between about 80° to about 190° C. and a microcrystalline wax, wherein the weight ratio of the zinc salt of rosin to the isoprene-piperylene copolymer is in the range of about 0.55:1 to about 50:1, wherein the components are present in the following ranges:

| Component | Weight Per Cent |
|---|---|
| Styrene-Isoprene Block Copolymer | 15–30 |
| Mixture of Isoprene-Piperylene Copolymer and Zinc Salt of Rosin | 15–60 |
| Microcrystalline Wax | 70–10, | wherein the styrene-isoprene block copolymer has the following general configuration:

A — B — A, wherein A is a styrene polymer block having an average molecular weight of about 2,000 to about 100,000 and B is an isoprene polymer block having an average molecular weight of about 25,000 to about 1,000,000, wherein the total of the terminal blocks A amount to about eight to about 50 weight percent of the block copolymer, with the difference in glass transition temperature between an end block A and a center block B being greater than about 100° C.

2. The composition of claim 1 wherein the weight ratio of the zinc salt of rosin to the isoprene-piperylene copolymer is in the range of about 1:1 to about 5:1.

3. The composition of claim 1 wherein the components are present in the following ranges:

| Component | Weight Per Cent |
|---|---|
| Styrene-Isoprene Block Copolymer | 20–28 |
| Mixture of Isoprene-Piperylene Copolymer and Zinc Salt of Rosin | 20–60 |
| Microcrystalline Wax | 60–12 |

4. The composition of claim 1 wherein the styrene polymer block has an average molecular weight of about 5,000 to about 50,000 and the isoprene polymer block has an average molecular weight of about 50,000 to about 500,000.

5. The composition of claim 1 wherein the total of the terminal blocks A amount to about 10 to about 40 weight percent of the block copolymer.

6. The composition of claim 1 wherein the isoprene-piperylene copolymer has a melting point of 70° to about 130° C.

* * * * *